United States Patent [11] 3,617,162

[72] Inventors Siegfried K. June
Newark;
William A. Neely, Wilmington, both of Del.
[21] Appl. No. 702,801
[22] Filed Feb. 5, 1968
[45] Patented Nov. 2, 1971
[73] Assignee E. I. du Pont de Nemours and Company
Wilmington, Del.

[54] METHOD FOR DYEING GLASS FIBERS AND PRODUCT THEREOF
11 Claims, No Drawings
[52] U.S. Cl. .................................................... 8/8,
8/18, 65/30, 117/126, 134/3
[51] Int. Cl. ........................................................ C03c 17/00,
D06p 3/80
[50] Field of Search ........................................... 8/8, 18;
65/30; 134/3; 117/126 GI

[56] References Cited
UNITED STATES PATENTS
2,582,919  1/1952  Biefeld ........................ 8/8 X
2,593,818  4/1952  Waggoner .................... 117/126 X
2,754,224  7/1956  Caroselli ...................... 117/126 X
OTHER REFERENCES
Jones, Inorg. Chem., 1949, p. 672 Moeller, Inorg. Chem. 1952, p. 880
Schlesinger, Gen. Chem., 1938, p. 769

Primary Examiner—Donald Levy
Assistant Examiner—Patricia C. Ives
Attorney—Lynn N. Fisher ABSTRACT: Glass fibers are coronized and then contacted with aqueous chromic acid. The chromic acid treatment increases the surface area of the fibers and deposits chromate ions on their surface. The treated fibers are washed to remove excess chromate ions, dyed with a cationic or mordant dye and then overcoated with a suitable material, e.g., a plastic or elastomeric film or a chrome complex.

METHOD FOR DYEING GLASS FIBERS AND PRODUCT THEREOF

BACKGROUND OF THE INVENTION

Glass fibers have been very difficult to dye because of their physical and chemical properties. Among other things these fibers have smooth surfaces and are relatively inert in comparison with organic textile fibers.

Many methods have been proposed; one that is in use involves coating glass fabrics with resin containing dispersed dyes. Such fabrics are stiff and have poor laundry and dry cleaning resistance, further the colors produced are not very bright. Thus such fabrics are not generally used for such items as bedspreads, tablecloths and clothing.

Of the many direct dyeing methods that have been proposed, such as the process of U.S. Pat. No. 2,582,919, none are commercially satisfactory.

SUMMARY OF THE INVENTION

This invention is directed to glass fibers, filaments, yarns or fabrics which can be readily dyed and to the processes for dyeing such fibers, filaments, yarns or fabrics.

The glass fibers of the invention are fibers which have been treated with a heated 0.1 to 50 percent aqueous solution of chromic acid for a period of time to increase their surface area and to deposit chromate ions of their surface.

These glass fibers are washed to remove the excess chromic acid and then dyed with cationic (basic) dyes or, in a less preferred embodiment, with mordant type dyes. The dyed fiber can then be overcoated with various materials, e.g., plastics, elastomers, resinous type materials or chrome complexes.

The resulting fibers form fabrics which are uniformly dyed, brightly colored, with good hand and fastness to light, and good resistance to laundering, crocking and drycleaning.

DETAILED DESCRIPTION OF THE INVENTION

The glass fibers useful in the invention are both nonborosilicate glass fibers and borosilicate glass fibers, and particularly the latter. The particular constituents of the fibers are not critical, and any of the glass fibers presently in use can be treated according to the invention.

The fiber can be treated according to the invention while in the form of a single fiber, strand, filament, or when in the form of woven or unwoven fabrics. The use of the term "fiber" hereinafter is intended to cover all of these various physical forms.

In the making of glass fibers, the fibers are generally coated with an oily, greasy or waxy material in order to prevent abrasion. These coatings can create problems in the treating of the fibers. Thus normally it will be desirable to remove these coatings prior to treatment. This can be accomplished by use of a suitable solvent, but usually it will be accomplished by coronizing. Coronizing consists of heat treating and crimping the fibers at a temperature of about 1200° F. until the coating is removed.

The uncoated glass fiber is then treated with heated, aqueous chromic acid.

This treatment accomplishes two results; first, it leaches out various nonsiliceous components of the fiber, e.g., boron, aluminum, and sodium metal ions and also the oxides of these metals. This leaching results in a macroporous surface having increased surface area. Under most conditions it will be found that about a 10 percent by weight loss is caused by the leaching step. This, of course, reduces to some extent the strength of the fiber, but not enough to detract from its usefulness.

Secondly, the treatment deposits chromate ions on the macroporous surface of the fiber, thus creating a negatively charged surface.

Although applicant does not mean to be bound by the following theory, it is his belief that the chromate ions are held on to the surface of the glass by the formation of a Si-O-Cr bond. However, it is possible that the chromate ions are held on the surface merely by electrostatic bonding. In any event, the chromate is held on the surface and does not wash off.

This combination of increased surface area and chromate ions present on the surface creates a reactive surface that is very receptive to cationic type dyes. The surface is also receptive to mordant type dyes; however, the use of cationic dyes is preferred.

The chromic acid used should be at such a concentration that a 0.1 to 50 percent aqueous solution of dichromate ion is obtained. Preferred concentrations are 1 to 20 percent and most preferred are 5 to 15 percent.

The chromic acid should also be heated; when it is used at room temperatures, the treating time is unduly prolonged. The acid is preferably used at a temperature of 130° to 212° F.

The time of the acid treatment is not critical and it depends upon the concentration and temperature of the acid. At higher concentrations or higher temperatures, shorter times will be used. Thus at a temperature of 160°–165° F., times of 20–25 minutes are generally required. Further, the time for this treatment will depend on whether individual fibers or fabrics are being treated, and also the type of fabric. Thus the time to treat a tightly woven fabric will be greater than that for a single fiber. One skilled in the art can readily determine the best timing for his particular fabric.

The treating material, aqueous chromic acid, is an acidic, aqueous solution of dichromate ions.

The preferred source of the chromate ions is chromium trioxide, that is $CrO_3$, or its hydrate chromic acid, $H_2CrO_4$, or the dichromate $H_2Cr_2O_7$. Other sources of chromate ions are sodium, potassium, lithium or ammonium dichromate. However, with the use of these latter compounds, another acid, such as sulfuric, should also be used. Further, with these compounds, they should be present in such amounts to provide the desired concentration of $Cr_2O_7=$ in the aqueous solution.

It has been found that the presence of sulfuric acid is a benefit in some instances, depending upon the dye or source of $Cr_2O_7=$ to be used. Thus the chromic acid composition can contain 0 to 10 percent $H_2SO_4$, preferably 0.5 to 5 percent, and most preferred 0.5 to 2 percent. Generally it is desirable not to use too much sulfuric acid in view of the effect of this acid on the strength of the glass fibers. Thus when it is present it should be present in the approximate ratio of 10 parts $CrO_3$ to one part $H_2SO_4$.

After the chromic acid treating step, the treated glass fibers are washed in cold water to remove the excess acid. Prior to the treatment the glass fibers have a white color; after being treated with the chromic acid they will have a dark yellow color. The washing step removes the excess chromate ion, and the fibers will then have a light yellow color. This indicates the presence of residual chromate ions on the surface of the fibers.

The fibers can then be dyed with cationic (basic) or mordant type dyes, the cationic dyes being preferred. These dyes in some fashion hook up with the glass fibers through the negatively charged surface of the residual chromate ions and a good bond is obtained.

Again, although the Applicant does not intend to be bound thereto, it is his belief that the chromate ions on the surface also act as a "retarder" controlling the rate of dye absorption and as a result avoids blotching. Further, with the cationic type dyes, the chromium is removed from the fiber glass during the dyeing step. It is thought that the dye reduces the $Cr^{+6}$ present to $Cr^{+3}$ and the latter leaves the surface as the dye attaches.

Exemplary of useful cationic dyes are the following:

| Dye Name | C.I. Number |
| --- | --- |
| Basic Violet 10 | 45170 |
| Basic Red 1 | 45160 |
| Basic Yellow 11 | 48055 |
| Basic Blue 4 | 51004 |
| Basic Orange 21 | 48035 |
| Basic Green 3 | |

| Dye Name | C.I. Number |
| --- | --- |
| Basic Violet 3 | 42555 |
| Basic Violet 2 | 42520 |
| Basic Green 1 | 42040 |
| Basic Green 4 | 42000 |

Exemplary of useful mordant type dyes are the following:

| Dye Name | C.I. Number |
| --- | --- |
| Mordant Yellow 1 | 14025 |
| Mordant Yellow 8 | 18821 |
| Mordant Yellow 10 | 14010 |
| Mordant Yellow 18 | 13990 |
| Mordant Orange 1 | 14030 |
| Mordant Blue 1 | 43830 |

The dyes are applied as aqueous composition. The concentration and time for dyeing are not critical to this process, and whatever is generally used by the dye industry for the dye involved will be satisfactory. Generally high concentrations are avoided because they are wasteful of dyes, and normally dilute solutions with longer dyeing times will be used.

After the dyeing step, the dyed fibers are rinsed and dried. The fibers at this time have dry cleaning resistance; however they are generally overcoated with a material to give laundry resistance.

The overcoating material used is not critical and include such materials as resins, plastics, elastomers, chrome complexes and the like can be used. Exemplary of useful overcoating materials are:
silanes of ethylene-methacrylic acid copolymers,
copolymers of methacrylic acid chrome complex and alkylacrylates,
Werner type chromium complexes, such as "Quilon" (trademark of the Du Pont Company),
fluorinated chrome complexes such as "Scotchguard" (trademark of Minnesota Mining and Manufacture, Inc.),
butadiene-acrylonitrile latex,
thermosetting resins,
cationic long chain nitrogen compounds, such as "Zelan" (trademark of the du Pont Company),
organopolysiloxanes.

The dried fabric is generally placed in a solution of the overcoating material at room or elevated temperatures and allowed to react for a short period of time. The excess solution is then removed and the fabric dried at elevated temperatures.

Subsequently, any of the conventional processes or operations of the fiber glass industry can be employed on the dyed fibers.

The final dyed fibers can be used for any of the conventional uses of glass fibers and also areas wherein bright color fabrics and fabrics with good hand are desired, i.e., tablecloths, bedspreads, draperies, clothing and the like.

The invention will now be illustrated by the following examples.

EXAMPLE 1

A piece of heat cleaned (coronized) fibrous glass fabric is placed in an aqueous solution of chromium trioxide (10 percent by weight $CrO_3$) at 160° F. for 25 minutes. The fabric is made of beta fibers, which fibers have an average diameter of 3.8 microns. The fabric is then removed and the excess acid washed off with cold water. The treated fabric is then placed in a dye bath containing 3 percent of "Sevron" Blue 5G dye (based on weight of fabric). The temperature of the dye bath is rapidly increased from 74° C. to 212° F. and then maintained at 212° F. for 30 minutes.

The fabric is removed and the excess dye washed off in cold water and the fabric is then dried at 266° F. The dried fabric is then placed in a 1 wt./vol. percent of an olefinic copolymer containing pendant silane groups, in "Perclene" peechluroethylene solvent at 158° F. The fabric is removed after 30 minutes, air dried for 5 minutes, and then oven dried at 266° F. for 45 minutes.

The resulting fabric is placed in a 0.5 percent soap solution at 130° F. for 30 minutes with agitation and there is essentially no loss of color. Another sample is tested in "Perclene" to determine the fastness of the dyeing to drycleaning and it is rated as very good.

EXAMPLE 2

A piece of heat cleaned (coronized) fibrous glass fabric (beta fiber of 3.8 micron diameter) is placed in an aqueous solution of chromium trioxide (10 percent by weight $CrO_3$) at 160° F. for 25 minutes. The fabric is then removed and the excess acid washed off with cold water. The treated fabric is then entered into a dye bath containing 2 to 3 percent of Crystal Violet dye (based on weight of fabric). The temperature of the dye bath is rapidly increased from 74° F. to 212° F. and then maintained at 212° F. for 30 minutes.

The fabric is removed and the excess dye washed off in cold water and the fabric is then dried at 266° F. The dried fabric is then placed in a 10 percent solution of "Quilon" C (a Werner type chrome complex) for 5 minutes at room temperature. The fabric is then dried at 266° F.

This results in a brightly colored fabric with good hand and resistance to laundering and drycleaning.

EXAMPLE 3

A piece of heat cleaned (coronized) fibrous glass fabric (beta fiber) is placed in an aqueous solution of chromium trioxide (10 percent by weight of $CrO_3$, 7/1 weight ratio $CrO_3$/concentrated $H_2SO_4$) at 150° F. for 15 minutes. The fabric is then removed and the excess acid washed off with cold water. The treated fabric is entered into a dye bath containing 3 percent of Brilliant Green Crystals dye (based on weight of fabric). The temperature of the dye bath is raised from 74° F. to 212° F. over a 20-minute period and then maintained at 212° F. for an additional 60 minutes.

The fabric is removed and the excess dye washed off in cold water and the fabric dried at 230° F. The dried fabric is then placed in a 3 percent solution of a methacrylato chromic chloride-methyl methacrylate copolymer for 4 minutes at room temperature. The fabric is removed and air dried for 10 minutes then oven dried at 266° F. for 30 minutes. The resulting fabric exhibits excellent dye retention after being washed for 1 hour at 130° F. in a 0.5 percent soap solution.

EXAMPLE 4

A piece of heat cleaned (coronized) fibrous glass fabric (beta fiber) is placed in an acidified aqueous solution of potassium dichromate (15% $K_2Cr_2O_7$ and 2 percent concentrated $H_2SO_4$) at 160° F. for 25 minutes. The fabric is then removed and the excess acid washed off with cold water.

The treated fabric is then placed in a dye bath containing 3 percent of "Sevron" Yellow R dye (based on the weight of the fabric) and 0.5 percent of a nonionic surface active agent and 1.0 percent glacial acetic acid. The temperature of the dye bath is rapidly increased from 74° F. to 212° F. and then maintained at 212° F. for 30 minutes.

The fabric is removed and the excess dye is washed off in cold water and the fabric dried at 266° F. The dried fabric is then placed in a 4 percent solution of "Zelan" (a cationic long chain nitrogen compound) at 95–115° F. for 5 minutes. The fabric is removed and dried at 230° F.

We claim:

1. A method for treating glass fibers comprising contacting glass fibers with a 0.1 to 50 weight percent aqueous solution of chromic acid containing 0 to 10 weight percent of $H_2SO_4$ at a temperature of about 130 to 212° F. until the surface area of said fibers is increased and a chromium-containing material is deposited on the surface of the fibers.

2. The process of claim 1 wherein the glass fibers are coronized prior to the treatment with the aqueous chromic acid solution.

3. A method for treating glass fibers comprising contacting glass fibers with a 0.1 to 50 weight percent aqueous solution of chromic acid containing 0 to 10 weight percent of $H_2SO_4$ at a temperature of about 130 to 212° F. until the surface area of said fibers is increased and a chromium-containing material is deposited on the surface of the fibers, washing said fibers, and dyeing said fibers with a cationic or mordant type dye.

4. A method for treating glass fibers comprising contacting glass fibers with a 0.1 to 50 weight percent aqueous solution of chromic acid containing 0 to 10 weight percent of $H_2SO_4$ at a temperature of about 130 to 212° F. until the surface area of said fibers is increased and a chromium-containing material is deposited on the surface of the fibers, washing said fibers, and dyeing said fibers with a cationic type dye.

5. A method for treating glass fibers comprising contacting glass fibers with a 0.1 to 50 weight percent aqueous solution of chromic acid containing 0 to 10 weight percent of $H_2SO_4$ at a temperature of about 130 to 212° F. until the surface area of said fibers is increased and a chromium-containing material is deposited on the surface of the fibers, washing said fibers, dyeing said fibers with a cationic or mordant type dye, and coating with an overcoat material selected from the group consisting of chrome complexes, elastomeric materials, plastic materials, resinous materials, and organo-silanes.

6. Method for treating glass fibers comprising contacting glass fibers with a 0.1 to 50 weight percent aqueous solution of chromic acid containing 0 to 10 weight percent of $H_2SO_4$ at a temperature of about 130 to 212° F. until the surface area of said fibers is increased and a chromium-containing material is deposited on the surface of the fibers, washing said fibers, dyeing said fibers with a cationic type dye, and coating with an overcoat material selected from the group consisting of chrome complexes, elastomeric materials, plastic materials, resinous materials, and organosilanes.

7. Glass fibers suitable for dyeing with cationic and mordant dyes being prepared by treating glass fibers with a 0.1 to 50 weight percent aqueous solution of chromic acid containing 0 to 10 weight percent of $H_2SO_4$ at a temperature of about 130 to 212° F. until the surface area of said fibers is increased and a chromium-containing material is deposited on the surface of the fibers.

8. Colored glass fibers being prepared by treating glass fibers with a 0.1 to 50 weight percent aqueous solution of chromic acid containing 0 to 10 weight percent of $H_2SO_4$ at a temperature of about 130 to 212° F. until the surface area of said fibers is increased and a chromium-containing material is deposited on the surface of the fibers, and then dyeing the fibers with a cationic or mordant type dye.

9. Colored glass fibers being prepared by treating glass fibers with a 0.1 to 50 weight percent aqueous solution of chromic acid containing 0 to 10 weight percent of $H_2SO_4$ at a temperature of about 130 to 212° F. until the surface area of said fibers is increased and a chromium-containing material is deposited on the surface of the fibers, and then dyeing the fibers with a cationic or mordant type dye and coating the dyed fibers with a protective material which gives them laundry resistance.

10. Colored glass fibers being prepared by treating glass fibers with a 0.1 to 50 weight percent aqueous solution of chromic acid containing 0 to 10 weight percent of $H_2SO_4$ at a temperature of about 130 212° F. until the surface area of said fibers is increased and a chromium-containing material is deposited on the surface of the fibers, and then dyeing the fibers with a cationic type dye.

11. Colored glass fibers being prepared by treating glass fibers with a 0.1 to 50 weight percent aqueous solution of chromic acid containing 0 to 10 weight percent of $H_2SO_4$ at a temperature of about 130 to 212° F. until the surface area of said fibers is increased and a chromium-containing material is deposited on the surface of the fibers and then dyeing the fibers with a cationic type dye and coating the dyed fibers with a protective material which gives them laundry resistance.

* * * * *